United States Patent
Griffin (10) Patent No.: US 11,558,199 B1
(45) Date of Patent: *Jan. 17, 2023

(54) SYSTEMS AND METHODS FOR PRIVACY PRESERVING DISTRIBUTED LEDGER CONSENSUS

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/039,555

(22) Filed: Sep. 30, 2020

Related U.S. Application Data (63) Continuation of application No. 15/956,137, filed on Apr. 18, 2018, now Pat. No. 10,797,885.

(51) Int. Cl.
| | |
|---|---|
| *H04L 9/40* | (2022.01) |
| *H04L 9/32* | (2006.01) |
| *G06F 21/64* | (2013.01) |
| *G06F 16/18* | (2019.01) |

(52) U.S. Cl.
CPC ........ *H04L 9/3247* (2013.01); *G06F 16/1805* (2019.01); *G06F 21/64* (2013.01); *H04L 9/3231* (2013.01); *H04L 9/3236* (2013.01)

(58) Field of Classification Search
CPC ... H04L 9/3247; H04L 9/3231; H04L 9/3236; G06F 16/1805; G06F 21/64
See application file for complete search history.

(56) References Cited

U.S. PATENT DOCUMENTS

| | | |
|---|---|---|
| 7,536,336 B1 | 5/2009 | Guinan |
| 9,544,424 B1 | 1/2017 | Cain et al. |
| 9,912,486 B1 | 3/2018 | Sharifi Mehr |
| 10,075,300 B1 | 9/2018 | Maeng et al. |
| 10,251,053 B1 * | 4/2019 | Paczkowski ............ H04W 8/22 |
| 10,277,400 B1 | 4/2019 | Griffin et al. |
| 10,824,759 B1 * | 11/2020 | Magerkurth .......... G06F 21/602 |

(Continued)

OTHER PUBLICATIONS

Seibold et al., Blockchain Consensus Immutable Agreement for the Internet of Value, kpmg.com, 2016. 28 pages.

*Primary Examiner* — Ghodrat Jamshidi
(74) *Attorney, Agent, or Firm* — Foley & Lardner LLP (57) ABSTRACT

A method includes receiving a consensus agreement rule ("CAR") comprising identities of a first party and second party; receiving a first SignedData message comprising first content and a first digital signature; creating a second SignedData message comprising a second digital signature of the second party on a hash of the second content and an acceptance indication; verifying, based on the acceptance indication and based on the identities on the CAR matching the identities on the signatures, that the second party accepted the terms of the agreement; and transmitting the second SignedData message to a trusted party for posting to a distributed ledger, wherein the terms of the agreement are kept private while the second SignedData message is posted to the distributed ledger, and wherein the terms of the agreement are formatted as a smart contract whose execution causes a transfer of value in response to a fulfillment of a condition.

20 Claims, 7 Drawing Sheets

(56) References Cited

U.S. PATENT DOCUMENTS

| | | | |
|---|---|---|---|
| 2004/0111331 A1* | 6/2004 | Yano | G06Q 30/02 |
| | | | 705/37 |
| 2004/0249768 A1 | 12/2004 | Kontio et al. | |
| 2009/0063356 A1* | 3/2009 | Heise | G06Q 50/188 |
| | | | 705/80 |
| 2014/0365350 A1* | 12/2014 | Shvarts | G06Q 40/00 |
| | | | 705/35 |
| 2016/0112417 A1 | 4/2016 | Attia et al. | |
| 2016/0300223 A1* | 10/2016 | Grey | G06Q 20/3825 |
| 2017/0372392 A1* | 12/2017 | Metnick | G06Q 30/0613 |
| 2018/0075028 A1 | 3/2018 | Ruschin et al. | |
| 2018/0152297 A1 | 5/2018 | Fielding et al. | |
| 2018/0309581 A1* | 10/2018 | Butler | H04W 12/069 |
| 2019/0163896 A1 | 5/2019 | Balaraman et al. | |
| 2019/0363889 A1 | 11/2019 | Wang | |
| 2020/0051056 A1 | 2/2020 | Thevoz | |
| 2021/0201396 A1* | 7/2021 | Soundararajan | G06Q 20/388 |
| 2021/0279723 A1* | 9/2021 | Magerkurth | G06F 21/602 |

* cited by examiner

SYSTEMS AND METHODS FOR PRIVACY PRESERVING DISTRIBUTED LEDGER CONSENSUS

CROSS-REFERENCE TO RELATED APPLICATIONS

The present application is a continuation of and claims priority to U.S. patent application Ser. No. 15/956,137 titled "SYSTEMS AND METHODS FOR PRIVACY PRESERVING DISTRIBUTED LEDGER CONSENSUS," filed Apr. 18, 2018, the entirety of which is incorporated herein by reference and for all purposes.

TECHNICAL FIELD

The present application relates generally to systems and methods for distributed ledgers.

BACKGROUND

A distributed ledger, such as a blockchain, is a series of signed, hash-linked, append-only, timestamped blocks, each block containing arbitrary data. When viewed as a linked-list data structure, a distributed ledger is a limited data "stack" whose operations only allow users to "push" blocks onto the top. Users are not allowed to modify blocks or to "pull" blocks off of the top. Each new block that is added is appended to the topmost block in the stack. A new block links back to the former top-of-stack block by including a hash (e.g., a smaller mathematical representation) of the preceding block in the new block and binding this hash to the new block under a digital signature. The blocks of a distributed ledger may contain a variety of information, such as transactions, agreements, contracts, documents, and so on. In a typical distributed ledger, any users with access may view the information stored in the blocks of the distributed ledger.

SUMMARY

One embodiment relates to a method of demonstrating consensus agreement. The method includes creating, by a first party, a consensus agreement rule ("CAR") including at least identities of the first party and a second party and digital certificates for the first party and the second party; creating, by the first party, a first SignedData message comprising at least first content and a first digital signature of the first party on at least a hash of the first content and an offer indication, wherein the first content includes terms of an agreement between the first party and the second party; and transmitting the first SignedData message to the second party. The method further includes receiving, from the second party and by the first party, a second SignedData message comprising at least second content and a second digital signature of the second party on at least a hash of the second content and an acceptance indication, wherein the second content comprises a third SignedData message, the third SignedData message comprising the first digital signature; verifying, based on the acceptance indication, that the second party accepted the terms of the agreement; and in response to the verification, transmitting the second SignedData message to a trusted party for posting to a distributed ledger. The terms of the agreement are thus kept private to the first and second parties when the second SignedData message is posted to the distributed ledger.

Another embodiment relates to a system of demonstrating consensus agreement. The system is associated with a first party to an agreement and includes a processor and a non-transitory machine readable medium with instructions stored thereon. When executed by the processor, the instructions cause the system to create a CAR including at least identities of the first party and a second party and digital certificates for the first party and the second party; create a first SignedData message comprising at least first content and a first digital signature of the first party on at least a hash of the first content and an offer indication, wherein the first content includes terms of the agreement between the first party and the second party; and transmit the first SignedData message to the second party. The instructions further cause the system to receive, from the second party, a second SignedData message comprising at least second content and a second digital signature of the second party on at least a hash of the second content and an acceptance indication, wherein the second content comprises a third SignedData message, the third SignedData message comprising the first digital signature; verify, based on the acceptance indication, that the second party accepted the terms of the agreement; and in response to the verification, transmit the second SignedData message to a trusted party for posting to a distributed ledger. The terms of the agreement are thus kept private to the first and second parties when the second SignedData message is posted to the distributed ledger.

Another embodiment relates to a method of demonstrating consensus agreement. The method includes receiving a first SignedData message comprising at least first content and a first digital signature of a first party on at least a hash of the first content and an acceptance indication, wherein the first content comprises a second SignedData message, the second SignedData message comprising at least a second digital signature of a second party on at least a hash of second content and an offer indication, the second content including terms of an agreement between the first party and the second party. The method further includes retrieving a CAR for the first party and the second party, wherein the CAR includes at least identities of the first party and the second party and digital certificates for the first party and the second party, verifying identities of the first party and the second party in the first SignedData message against the identities in the CAR; validating the first and second digital signatures based on the digital certificates in the CAR; and, in response to successful verification of the identities and validation of the digital signatures, posting the first SignedData message to a distributed ledger. The terms of the agreement are kept private to the first and second parties when the first SignedData message is posted to the distributed ledger.

DETAILED DESCRIPTION

Referring to the figures generally, various systems, methods, and apparatuses for implementing privacy preserving distributed ledger consensus agreements are described herein. An example implementation is described as follows. A system allows for the use of cryptographic techniques to create messages, such as X9.73 SignedData type messages. These messages may be used by two or more parties to indicate whether the parties have reached a consensus agreement as to the validity, acceptability, and/or state of a set of transactions recorded on a distributed ledger (e.g., a blockchain) or cloud environment associated with regular contract or smart contract processing. Consensus may be demonstrated, for example, using a SignedData message that captures the digital signatures of all parties required for agreement under a CAR, which is described in further detail below.

The cryptographic techniques used to create consensus messages require the parties to an agreement to possess a pair of cryptographic keys: a public key and a private key. For example, each key may be a very large prime number or related to a very large prime number. Each public/private key pair is selected such that a message encrypted with one of the keys can only be decrypted with the other key in the key pair. In general, a public key is made public (e.g., generally accessible and available to the public), while a private key is kept private to just the owner of the public/private key pair. Among other things, public/private key pairs may be used to digitally sign content. As an illustration, a party wanting to certify that a message has been created by the party may use a signing algorithm configured to create, using the message and the party's private key, a digital signature associated with the party. Further, the owner of a key pair may have a digital certificate that includes information about the owner's public key and a digital signature of an entity (e.g., an issuing certificate authority) that has verified the certificate's contents such that the owner may use the certificate to prove ownership of the public key. As such, the party's digital signature can subsequently be verified by a third party using a signature verifying algorithm with the message, the public key for the party (which the third party retrieves from the party's digital certificate) and the digital signature.

Accordingly, the required parties provide digital signatures in the CAR using their respective public keys of their public/private key pairs. The parties then create and sign one or more SignedData messages indicating whether the parties have reached a consensus agreement. Additionally, using the indirect signature ability of SignedData type messages (e.g., based on the ability to sign a hash of the content, rather than directly signing the content), the parties may demonstrate consensus by signing a SignedData message without including sensitive information in the message itself. The CAR for the parties may be included as an attribute in the SignedData consensus agreement message or, alternatively, may be stored in a database or directory and associated with the SignedData message. Regardless, a third party may verify the signatures of the required parties, and thus whether a consensus agreement has been reached, using the digital signature for the parties in the CAR. The SignedData message may further be posted on a distributed ledger to memorialize whether the parties reached the consensus agreement. However, because the content of the SignedData message is indirectly signed, sensitive information may be kept private between the parties to the agreement.

The systems, methods, and apparatuses for implementing privacy preserving distributed ledger consensus agreements offer several technical advantages over the prior art. With many current distributed ledgers, mining, proof of work processing, or proof of stake processing is required to achieve consensus. As an illustration, the consensus mechanism used by Ethereum® requires mining, which involves solving a difficult mathematical puzzle referred to as a proof of work problem, to gain a right to post a block to a blockchain. These techniques cannot scale to support commercial use in high speed and high volume transaction systems because they are designed to cause delay in posting blocks to the ledger, and because they require extensive amounts of energy. Many decentralized distributed ledger systems (e.g., permissionless distributed ledger systems, such as Ethereum® or Bitcoin, which are available to a large number of users) face similar issues. As another illustration, the Visa® payment network is believed to do 45,000 peak transactions per second on its network during holidays and averages hundreds of millions of transactions per day. Currently, Bitcoin supports around seven transactions per second with a one megabyte block limit. Thus, to post transactions to a decentralized distributed ledger is a costly and time-consuming process.

Distributed ledgers may alternatively be centralized (e.g., permissioned distributed ledgers, such as Hyperledger® Fabric and R3 Corda, where a centralized entity decides and attributes the right to individual peers to participate in the write or read operations of the distributed ledger), and centralized distributed ledgers often have better performance in terms of latency and throughput than decentralized distributed ledgers. Some permissioned distributed ledgers also do not require proof or work or proof of stake processing. However, centralized distributed ledgers also limit the users who read and write to the distributed ledger, and a central entity must manage the distributed ledger. Thus, a centralized distributed ledger may not be acceptable for all applications, such as where it is desirable for the fact that a consensus agreement has been reached to be public knowledge such that it can be verified by third parties.

By contrast, the present systems, methods, and apparatuses for distributed ledger consensus agreements allow parties to reach a consensus and, rather than posting all of the transactions leading to that consensus, post just an indication of the consensus to a distributed ledger. For example, with reference to demonstrating consensus using a SignedData message with a CAR as discussed above, digital signature processing and comparing signers to the CAR constitutes the basis for demonstrating consensus, which can be attested to by a third party. Fewer consensus items are posted to a distributed ledger according to this approach, meaning that limited mining, proof of work processing, or proof of stake processing is required. This, in turn, means that the present systems, methods, and apparatuses for distributed ledger consensus agreements allow for consensus to be demonstrated on a distributed ledger in a faster and more cost-effective way. Further, because this approach is computationally simpler than traditional approaches for demonstrating consensus on a distributed ledger, this approach requires lowered storage and processing requirements from the computing systems used by the parties to demonstrate consensus, thereby freeing up bandwidth and processing capability for other functions. This also allows the present approach to be more easily scaled to a commercial level.

Furthermore, distributed ledgers typically have limited ability to keep information posted onto them confidential. The parties may encrypt the information posted onto a distributed ledger, but the encryption standards used by the party may eventually fail as new encryption threats emerge. Centralized distributed ledgers may also limit access to certain permissioned parties, but confidentiality still assumes that the parties will not misuse the information posted to the centralized distributed ledger and that the access controls will not fail. Alternatively, parties may use secured cryptographic containers to ensure that data remains confidential between the parties, but this approach may be complicated, for example, when the parties are doing multiple business deals or are using multiple rounds of negotiations and need a container for each round or deal.

Accordingly, another technical advantage of the present systems, methods, and apparatuses for distributed ledger consensus agreements is that a consensus agreement may be demonstrated using a cryptographic container that contains an indirect signature of the content. For example, the ordinary content attribute of the SignedData type, where content would typically be store, is optional and thus the content of the SignedData type may be detached. Thus, the parties may sign a hash of the content at issue, rather than the content itself, in a SignedData message (e.g., which is stored in the signed attributes of the SignedData message). In this way, the cryptographic container may be posted to a distributed ledger without any potentially sensitive content included, thus preserving the privacy of the agreement, but a third party having access to the content, the digital certificates for the parties, and the cryptographic container would still be able to verify that consensus was or was not reached between the parties. Additionally, this approach is more easily implemented than using secured cryptographic containers for each agreement or step of the agreement because the parties are able to post just the final cryptographic container indicating the consensus agreement, which eliminates complexity to the process. Moreover, the parties would be able to use the consensus agreement scheme described herein to show that messages posted to a distributed ledger allegedly showing that the parties reached a consensus— when the parties did not—are incorrect because such messages could not, for example, match the CAR for the parties.

Figure 1:
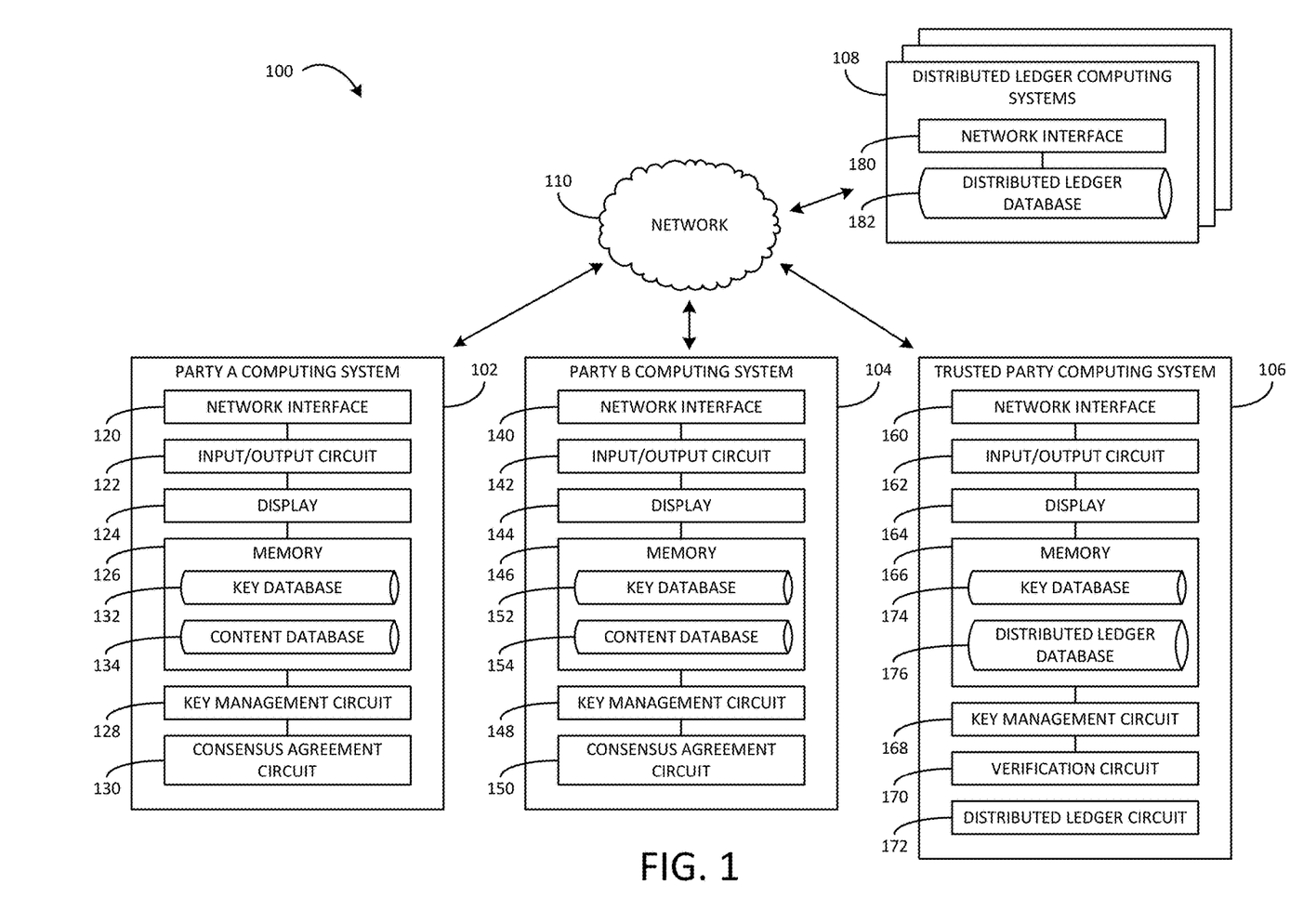
FIG. 1 is an environmental view of a system implementing privacy preserving distributed ledger consensus agreements, according to one embodiment.

Referring now to FIG. 1, an environmental view of a privacy preserving distributed ledger consensus system 100 is shown, according to an example embodiment. The system 100 includes computing systems associated with the parties to the consensus agreement, shown in FIG. 1 as Party A computing system 102 and Party B computing system 104. However, it should be understood a consensus agreement may involve any number of parties and thus that any number of computing systems associated with any number of parties to the consensus agreement may be included in the system 100. Additionally, the system 100 includes a trusted party computing system 106 and one or more distributed ledger computing systems 108. As shown, the components of the system 100 are connected by a network (e.g., network 110).

The Party A computing system 102 is associated with a first party to a consensus agreement ("Party A"). Similarly, the Party B computing system 104 is associated with a second party to the consensus agreement ("Party B"). In various embodiments, Party A and Party B may be individuals, companies, organizations, and so on. Accordingly, the Party A computing system 102 and the Party B computing system 104 are any computing systems that may be used to create and sign cryptographic messages, such as SignedData messages, as part of demonstrating a consensus agreement, as described in further detail herein. For example, the Party A computing system 102 and the Party B computing system 104 may include, but are not limited to, stationary computing devices (e.g., desktop computers, server systems, etc.), mobile computing devices (e.g., tablet computers, laptop computers, personal digital assistants, phones such as smartphones, etc.), portable gaming devices, wearable computing devices (e.g., smart watches, smart glasses, smart bracelets, etc.), and so on.

As shown in FIG. 1, the Party A computing system 102 includes a network interface 120, an input/output circuit 122, a display 124, a memory 126, a key management circuit 128, and a consensus agreement circuit 130. The network interface 120 of the Party A computing system 102 is adapted for and configured to establish a communication session via the network 110 with other components of the system 100. As used herein, a "network interface" may include any of a cellular transceiver (Code Division Multiple Access ("CDMA"), Global System for Mobile Communications ("GSM"), Long-Term Evolution ("LTE"), etc.), a wireless network transceiver (e.g., 802.11X, ZigBee, Bluetooth, etc.), and a combination thereof (e.g., both a cellular transceiver and a Bluetooth transceiver).

The input/output circuit 122 is structured to receive and provide communication(s) to the user of the Party A computing system 102. In this regard, the input/output circuit 122 is structured to exchange data, communications, instructions, etc. with input/output components of the Party A computing system 102. As such, the input/output circuit 122 may include hardware and associated logics configured to enable the Party A computing system 102 to exchange information with Party A. In certain embodiments, an input aspect of the input/output circuit 122 may allow Party A to provide information to the Party A computing system 102, and an output aspect of the input/output circuit 122 may allow Party A to receive information from the Party A computing system 102.

In various embodiments, the display 124 may be a screen, a touchscreen, a monitor, etc. The Party A computing system 102 may use the display 124 to communicate information to Party A (e.g., by displaying the information to Party A on the display 124) and/or to receive communications from Party A (e.g., through a keyboard provided on a touchscreen of the display 124). In some embodiments, the display 124 may be incorporated as part of the input/output circuit 122, while in other embodiments, the display 124 may be separate from the input/output circuit 122.

As shown in FIG. 1, the memory 126 is communicably and operatively coupled with the other components of the Party A computing system 102. The memory includes a key database 132 and a content database 134. The key database 132 is configured to retrievably store information relating to Party A's public/private key pair. As an example, the key database may store the public/private keys and digital certificate for Party A. The content database 134 is configured to retrievably store content for the consensus agreement messages created by Party A or Party B to indicate that either Party A and Party B have reached an agreement or have failed to reach an agreement. For example, the content database 134 may store a document (e.g., form, a contract, a smart contract, a deed, a will, etc.) for which Party A and Party B are using a consensus agreement message to indicate that they have reached, or have failed to reach, a consensus agreement on the document.

The key management circuit 128 is configured to manage the public/private key pair for Party A. For example, in some embodiments, the key management circuit 128 is configured to create a public/private key pair, ensure the generation of a certificate for the public key by a certifying authority, and retrievably store the public/private key pair and certificate in the key database 132. Alternatively, in some embodiments, the key management circuit 128 may be structured to communicate with an enterprise key management system that remotely generates and provisions public/private key pairs to the Party A computing system 102.

The consensus agreement circuit 130 is configured to create and sign cryptographic messages used by Party A and Party B to indicate whether Party A and Party B have reached an agreement. As an illustration, in various arrangements, the consensus agreement circuit 130 is configured to create, sign, send, and receive SignedData or similar (e.g., SigncryptedData) messages as part of indicating consensus agreement, as described in further detail below. It should be understood, however, that a consensus agreement may be demonstrated using any cryptographic data type where the content of the cryptographic data type may be indirectly signed (e.g., by signing a hash of the content of interest, rather than the content itself).

The Party B computing system 104 also includes a network interface 140, an input/output circuit 142, a display 144, a memory 146, a key management circuit 148, and a consensus agreement circuit 150. Likewise, the memory 146 of the Party B computing system 104 includes a key database 152 and a content database 154. In various arrangements, these components of the Party B computing system 104 are configured similarly to the corresponding components of the Party A computing system 104 described above. Additionally, in other embodiments of the system 100, the system 100 may include additional computing systems associated with additional parties to the consensus agreement and containing components similar to the Party A computing system 102 and the Party B computing system 104.

The system 100 also includes a trusted party computing system 106 associated with a trusted party. The trusted party is a third party to the agreement between Party A and Party B who verifies that a consensus has or has not been reached as demonstrated, for example, by a SignedData message created and signed by Party A and Party B as described in further detail below. For example, the trusted party may be an online notary. If the third party successfully verifies the SignedData message, the third party posts the message to a distributed ledger. However, it should be understood that while a trusted party computing system 106 is included in the embodiment of system 100 shown in FIG. 1, in other embodiments, the trusted party computing system 106 may not be included in system 100. As an example, Party A and/or Party B may verify the signatures on a SignedData consensus agreement message and post the verified message to a distributed ledger such that a trusted party is not needed.

As shown, the trusted party computing system 106 includes a network interface 160, an input/output circuit 162, a display 164, a memory 166, a key management circuit 168, a verification circuit 170, and a distributed ledger circuit 172. In various arrangements, the network interface 160, input/output circuit 162, display 164, and key management circuit 168 are configured similarly to the network interface 120, input/output circuit 122, display 124, and key management circuit 128, respectively, of the Party A computing system 102 discussed above.

The memory 166 includes a key database 174 and a distributed ledger database 176. Similar to the key database 132 of the Party A computing system 102, the key database 174 is configured to retrievably store information relating to the trusted party's public/private key pair. As an example, the key database 174 may store the public/private keys and digital certificate for the trusted party. The distributed ledger database 176 is configured to retrievably store information relating to the distributed ledger to which the trusted party posts the consensus agreement message once the consensus agreement message has been verified. For example, the distributed ledger database 176 may store the entirety or part of a distributed ledger downloaded from the one or more distributed ledger computing systems 108. The distributed ledger database 176 may also store the consensus agreement message received from Party A and Party B.

The verification circuit 170 is configured to verify that a consensus has been reached between Party A and Party B, or that Party A and Party B have failed to reach a consensus, based on the cryptographic consensus agreement message received from Party A and Party B. For example, the verification circuit 170 may be configured to receive a SignedData consensus agreement message from Party A and Party B. In response to receiving the message, the verification circuit 170 may compare the identities of Party A and Party B against identities included in a CAR and validate the signatures of Party A and Party B in the SignedData message. In some arrangements, the verification circuit 170 may further be configured to authenticate Party A and Party B based on a second authentication factor, such as by using biometric samples provided by Party A and Party B. If the verification circuit 170 is able to confirm, for example, that consensus has been reached, the signatures are valid, and the biometric samples matched the claimed identities, the verification circuit 170 is configured to post the message to a distributed ledger via the distributed ledger circuit 172.

The distributed ledger circuit 172 is configured to manage the operations of the trusted party computing system 106 with respect to the distributed ledger. Accordingly, the distributed ledger circuit 172 is configured to communicate with the one or more distributed ledger computing systems 108, for example, while posting a verified SignedData message to the distributed ledger. As an illustration, in some embodiments, the distributed ledger must be downloaded to a local computing system node before operations may be performed on the distributed ledger. Accordingly, the distributed ledger circuit 172 is configured to download the distributed ledger from the one or more distributed ledger computing systems 108 and retrievably store the distributed ledger in the distributed ledger database 176. The distributed ledger circuit 172 is further configured to post the verified SignedData message to the distributed ledger and transmit the modified ledger back to the distributed ledger computing system 108.

The one or more distributed ledger computing systems 108 are associated with the distributed ledger to which the trusted party computing system 106 posts the verified SignedData consensus agreement message. For example, the one or more distributed ledger computing systems 108 may be or include a central computer network storing the distributed ledger, computer nodes verifying transactions posted to the distributed ledger, computer nodes posting transactions to the distributed ledger, and so on. In various embodiments, the distributed ledger may be a permissionless or a permissioned ledger. If permissionless, the one or more distributed ledger computing systems 108 may include any computing system capable of downloading transactions posted to, verifying transactions posted to, and/or posting transactions to the distributed ledger. If permissioned, the one or more computing systems 108 may be associated with one or more trusted entities, including the trusted party computing system 106, and given access to the distributed ledger for the purposes of posting transactions and verifying transactions posted to the distributed ledger. Moreover, in some embodiments, the distributed ledger computing system 108 may be a single computing system, for example, trusted to verify and maintain a distributed ledger.

As shown in FIG. 1, the one or more distributed ledger computing systems 108 each include at least a network interface 180 and a distributed ledger database 182. In various arrangements, the network interface 180 is configured similarly to the network interface 120 of the Party A computing system 102 described above. Additionally, in various embodiments, the distributed ledger database 182 is configured similarly to the distributed ledger database 176 of the trusted party computing system 106. Accordingly, the distributed ledger database 176 is configured to retrievably store information relating to the distributed ledger, which information may, for example, be downloaded from a central computing system or from the other distributed ledger computing systems 108. It should be understood, however, that in some embodiments, the one or more distributed ledger computing systems may include components in addition to the network interface 180 and the distributed ledger database 182. For example, a given distributed ledger computing system 108 may include an input/output circuit, display, distributed ledger circuit, etc.

As discussed above, in order to demonstrate whether the parties have reached a consensus agreement, the parties to an agreement (e.g., Party A and Party B) may create a CAR including their digital signatures. The parties may then create a SignedData message indicating whether the parties have reached a consensus agreement, which the parties digitally sign. Assuming that the "indefinite length encoding" of message data is used (e.g., the ability of the message data to be encoded in an indefinite link, where an indicator indicates that an end of data signal demonstrates how long the message data is), this would mean that the XML Encoding rules ("XER") or the Canonical Encoding Rules ("CER") of ASN.1 are used or that the indefinite length encoding alternative of the Basic Encoding Rules ("BER") are used. This allows the content field of a SignedData message to be removed without affecting the surrounding message. The same is not true for messages that are definite length encoded because removing the content would require encoding the rest of the message again to correct the length octets in the Tag-Length-Value form of the message. Because of this, the content of a SignedData message may be signed indirectly with the parties signing a hash of the content rather than the actual content. This allows the actual content of the consensus agreement to be removed from the SignedData message and therefore kept private when the SignedData message is, for example, sent to a third party or posted on a distributed ledger.

Thus, in an example implementation, using the Party A computing system 102, Party A creates and sends an ordinary SignedData message including an indirect signature (i.e., a signed hash of the content) on a transaction T1 to Party B. Party A retains the Hash(T1). The signed hash of the content, bound to T1 under the sender signature, is included in a messageDigest signed attribute of the SignedData message so that the sent message may be matched against a response from Party B. A signed attribute in the message contains an identifier of an applicable CAR, which is the consensus rule that is used (e.g., by a verifying third party) to judge whether or not consensus has been achieved, or the CAR is included as a signed attribute of the SignedData message. A transaction set identifier may also be included in or as a signed attribute.

If Party B agrees with and accepts the content in T1, using the Party B computing system 104, Party B creates and sends a second SignedData message to Party A that contains an acceptance indicator and either the SignedData message sent by Party A or the detached (completely omitting the content T1) version of the SignedData message sent by Party A. If Party B instead rejects the content of T1, then Party B returns the same message as above, except with a rejection indicator instead of an acceptance indicator. The signatures of the parties in the SignedData messages may be verified using the CAR, and a final SignedData message indicating either acceptance or rejection may further be posted to a distributed ledger to confirm whether a consensus agreement was reached between the parties. However, because the content of the SignedData message is indirectly signed, the actual content of the consensus agreement remains secure and with the parties to the agreement.

Figure 2A:
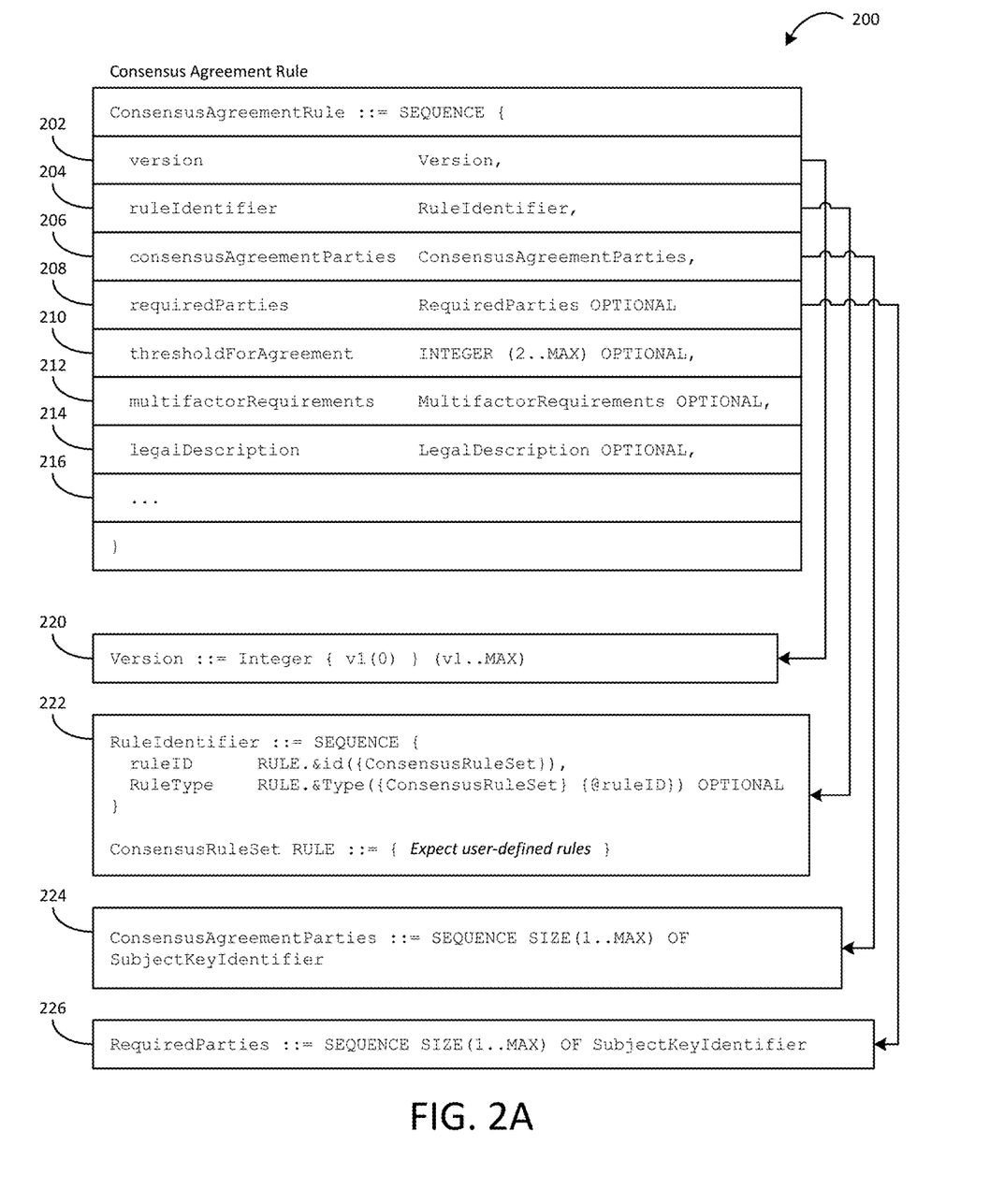
FIGS. 2A and 2B are a block diagram of a consensus agreement rule created to verify a consensus agreement, according to one embodiment.
Figure 2B:
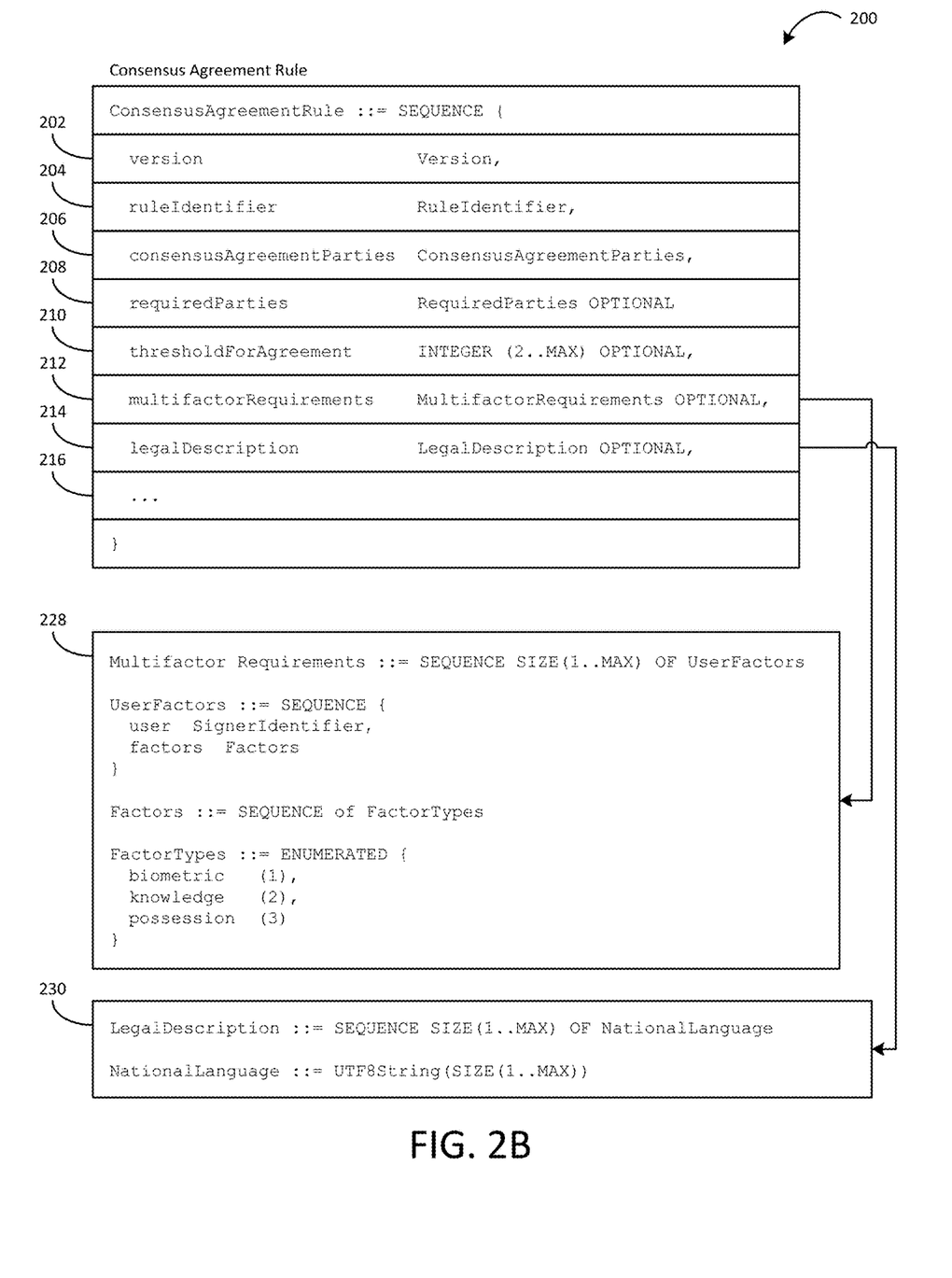

The CAR that is used to verify the signatures of the parties may include various components and values. Referring now to FIGS. 2A and 2B, a block diagram of a CAR 200 is shown, according to an example embodiment. As shown in FIGS. 2A and 2B, a CAR 200 may include a version component 202, a ruleIdentifier component 204, a consensusAgreementParties component 206, a requiredParties component 208, a thresholdForAgreement component 210, a multifactorRequirements component 212, and a legalDescription component 214. Further, in some embodiments, a CAR 200 may include additional components (e.g., as represented by section 216 in FIGS. 2A and 2B).

As further shown in FIGS. 2A and 2B, some of the components of the CAR 200 are defined by a particular type. More specifically, the version component 202 is defined by a Version type 220. The ruleIdentifier component 204 is defined by a RuleIdentifier type 222, the consensusAgreementParties component 206 is defined by a ConsensusAgreementParties type 224, the requiredParties component 208 is defined by a RequiredParties type 226, the multifactorRequirements component 212 is defined by a MultifactorRequirements type 228, and the legalDescription component 214 is defined by a LegalDescription type 230. Referring first to FIG. 2A, and looking first at the Version type 220, each CAR 200 includes a syntax version number of the CAR 200 in the Version type 220 of the version component 202.

Looking next at the RuleIdentifier type 222, each CAR 200 may be uniquely identifiable by a ruleID value included in the ruleIdentifier component 204 in the CAR 200. An optional RuleType value may be associated with the ruleID value and contain content of any type or format, such as descriptive prose or legal content associated with the CAR. Additionally, the RuleType includes a set of N of M parties, where N is at least 2 and N is less than or equal to M, and may include user-defined rules under a ConsensusRuleSet component.

With respect to the ConsensusAgreementParties type 224, a value of type SubjectKeyIdentifier from the signer's public key certificate identifies a party that is a participant in the CAR 200. Typically, a value of the SubjectKeyIdentifier type will contain the hash of a certificate subject's public key or the hash of the certificate issuer and serial number, which should be unique within the domain of usage. Accordingly, the ConsensusAgreementParties type 224 includes a SubjectKeyIdentifier type for each of the parties to the consensus agreement, thereby identifying the parties to the consensus agreement.

An optional list of required parties may be included as a value of type RequiredParties 226. This field makes it possible to express consensus as being, for example, "at least N signers from the list of parties, with all required parties present in the list."

Additionally, the CAR 200 also includes the optional thresholdForAgreement component 210. As shown, the number of parties whose signatures are required to demonstrate consensus may be included in the optional thresholdForAgreement component 210, which is a value of ASN.1 type INTEGER. This field is absent to indicate that all parties in the value of ConsensusAgreementParties are required to sign for consensus to be demonstrated, in which case the optional RequiredParties field should also be absent.

Referring now to FIG. 2B, the optional multi factorRequirements component 212 is also defined by a MultifactorRequirements type 228. In turn, the MultifactorRequirements type 228 is defined as a sequence of type UserFactors, which includes users defined by a SignerIdentifier element of SignedData and by a Factors type. The Factors type is ultimately defined by a number of factors that a party may possess in order to prove the party's identity, including a biometric, a knowledge factor (e.g., a password, a key code, etc.), and/or a possession factor (e.g., a chip, a card, etc.).

Looking next at the LegalDescription type 230, the LegalDescription type 230 includes a sequence of type NationalLanguage, which is any national language. Accordingly, the legalDescription component 214 may be used to describe the agreement at issue (e.g., in legal terms) in the language of the agreement.

Consensus agreement may be demonstrated by comparing the final SignedData consensus agreement message contents (e.g., the contents of a final SignedData message between Party A and Party B indicating either that the terms of the agreement have been finally accepted or rejected) against a CAR that the signing parties as members of the consensusAgreementParties component 206 set and the list of required signers under the requiredParties component 208. Any of the SignedData messages exchanged by the parties to reach the agreement may be placed on a distributed ledger, such as a blockchain, though placing only the final accepted or rejected message on the distributed ledger allows the content T1 to be shared only by Party A and Party B (due to the content being only indirectly signed in the final message) and decreases the amount of data that must be placed on the distributed ledger. In an audit of the ledger, either party can provide the T1 content, and its hash can be computed and used to attest to the validity of the signatures in the SignedData message(s).

Figure 3A:
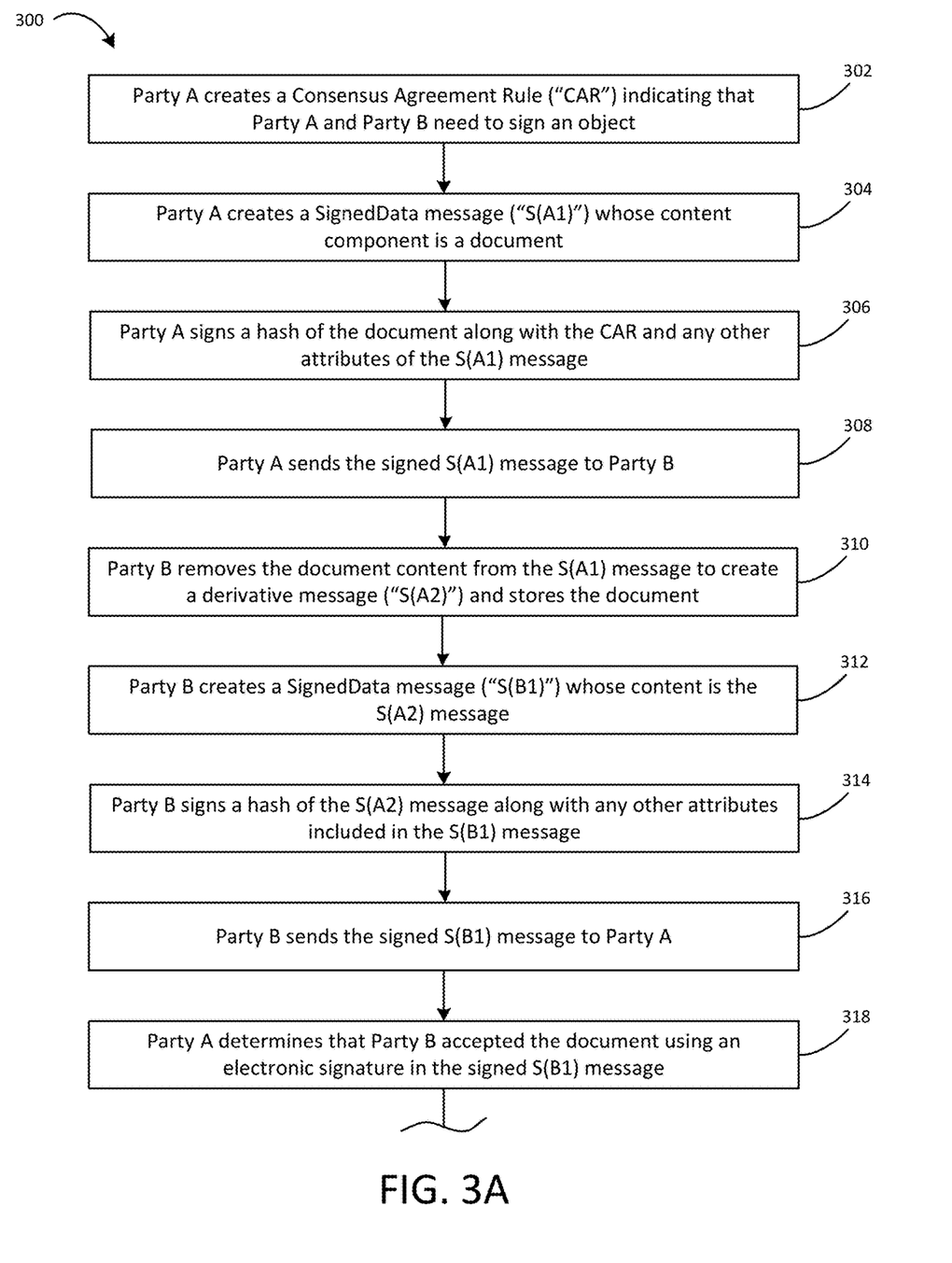
FIGS. 3A and 3B are a flow diagram showing a process of creating a privacy preserving consensus message and posting the message to a distributed ledger, according to one embodiment.
Figure 3B:
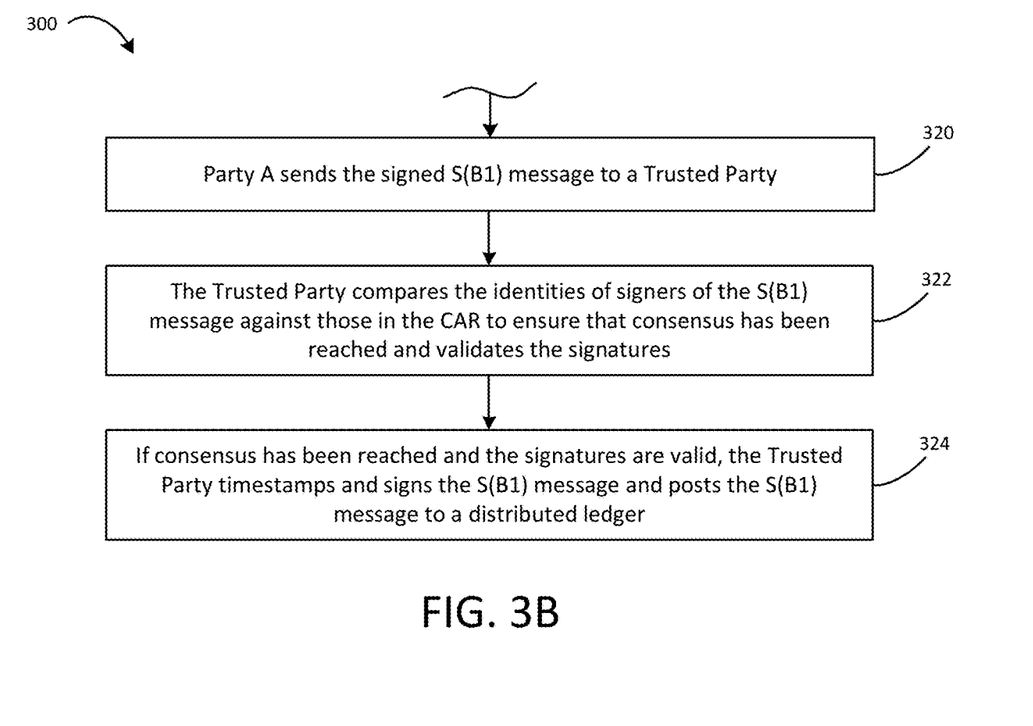

Referring now to FIGS. 3A and 3B, a flow diagram of a method 300 of creating a privacy preserving consensus message and posting the message to a distributed ledger is shown, according to an example embodiment. At step 302, Party A creates a CAR, for example, in a format supported by an online notary service and containing the information needed to later convince the notary that a consensus agreement has been reached between Party A and Party B. The CAR identifies Party A and Party B (e.g., using their digital public key certificates) and may further indicate that Party A and Party B must sign an object (e.g., a form, a contract, a smart contract, a deed, a will, etc.) associated with the CAR to demonstrate that a consensus agreement has been reached. Accordingly, Party A and Party B must sign the object using the private keys of their public/private key pairs associated with their identified public key certificates. As an option, the CAR may also contain legal prose in a descriptive text document.

As an illustration, the CAR may be specified as follows:

```
<ConsensusAgreementRule>
  <version>1</version>
  <ruleIdentifier><ruleID>1.2.3.4.
    </ruleID></ruleIdentifier>
  <consensusAgreementParties>
    <SubjectKeyIdentifier>Party A </SubjectKeyIdentifier>
    <SubjectKeyIdentifier>Party B</SubjectKeyIdentifier>
  </consensusAgreementParties>
</ConsensusAgreementRule>
```

At step 304, Party A creates a SignedData message (termed here as "S(A1)") whose content component is the object that Party A and Party B must sign. For example, the content component may be a document, such as a contract (termed here as "PartyAContract") containing terms to a proposed agreement between Party A and Party B. Additionally, the S(A1) message contains the CAR as an attribute, as well as any further attributes Party A chooses to include in the S(A1) message, such as an offer indication (termed here as "OFFER") and an intention to sign (termed here as "INTENT"). At step 306, Party A uses the indirect signature method of SignedData, which involves Party A signing a hash of the document, rather than the document itself, as a signed attribute of the S(A1) message. Additionally, Party A signs the CAR and any other attributes included in the S(A1) message. The signed S(A1) message may be described as follows:

S(A1)=SignedData {PartyAContract, Signed(Hash(PartyAContract), CAR, OFFER, INTENT)}

At step 308, Party A sends the signed S(A1) message to Party B. For example, to preserve the privacy of the PartyAContract content, Party A sends the signed S(A1) message to Party B over an encrypted channel or using an email that is signed and encrypted. At step 310, Party B removes the PartyAContract document content from the S(A1) message signed and sent by Party A to create a derivative message (termed here as "S(A2)"). To illustrate, this message may be specified as follows:

S(A2)=SignedData {Signed(Hash(PartyAContract), CAR, OFFER, INTENT)}

Removing the PartyAContract document does not impact the validity of Party A's signature in the S(A2) message as Party A signed the hash of the document rather than the document itself. As such, with the S(A2) message, Party B now has a version of the offer S(A1) message that protects the privacy of the PartyAContract details but preserves Party A's signature. Party B then stores a copy of the PartyAContract document (e.g., in the content database 154 of the Party B computing system 104).

At step 312, Party B creates a SignedData message (termed here as "S(B1)") whose content component is the S(A2) message. In the embodiment of method 300 shown in FIGS. 3A and 3B, Party B agrees to the terms included in the PartyAContract document. As such, Party B also includes any other desired attributes in the S(B1) message, such as an indication of Party B's acceptance (termed here as "ACCEPT") and an INTENT attribute. At step 314, Party B uses the indirect signature method of SignedData to sign a hash of the S(A2) message as a signed attribute. Party B also signs any other attributes included in the S(B1) message. This message may accordingly be specified as follows:

S(B1)=SignedData {S(A2), Signed(Hash(S(A2)), ACCEPT, INTENT)}

At step 316, Party B sends the signed S(B1) message to Party A. At step 318, Party A determines that Party B accepted the terms of the PartyAContract document using an electronic signature in the S(B1) message. Party A may further verify the S(B1) message by, for example, comparing like elements of S(A1) and S(A2), validating signatures, and performing other checks. Once satisfied, at step 320, Party A sends the S(B1) message to a Trusted Party such as an online notary.

At step 322, the Trusted Party compares the identities of the signers against those in the CAR to ensure that consensus has been reached. The Trusted Party may retrieve the CAR, for example, from the S(A2) message by decrypting the digital signatures of the parties on the S(B1) message and the S(A2) message (e.g., with known public keys of the parties). The Trusted Party further validates the signatures of Party A and Party B on the S(A2) message and the S(B1) message. At step 324, if consensus has been reached and the signatures are valid, the Trusted Party timestamps and signs the S(B1) message and posts the S(B1) message to a distributed ledger. Alternatively, just prior to submitting the S(B1) message for timestamping and posting, the Trusted Party may compute a hash of the final S(B1) message and enter the hash into a log of similar hashes, where the log serves as a sorted list of transactions already posted. As such, the Trusted Party could confirm that the log does not contain a duplicate of the S(B1) message and thus that the S(B1) message has not already been posted to the distributed ledger in an effort to prevent the S(B1) message from being posted multiple times.

Once the S(B1) message is finalized and posted, at a subsequent time, either Party A or Party B may provide the original PartyAContract document to a third party, who can determine whether the contract is valid using the S(B1) message or the information posted by the Trusted Party. For example, the third party may compute a hash of the PartyAContract and compare the computed hash to the hash of the PartyAContract in the SignedData message. If the two hashes match, then the third party may be confident that the content the third party has is the same content that Party A and Party B agreed upon. Further, the third party may validate the signatures of Party A and Party B using their respective digital certificates in the CAR.

Figure 4A:
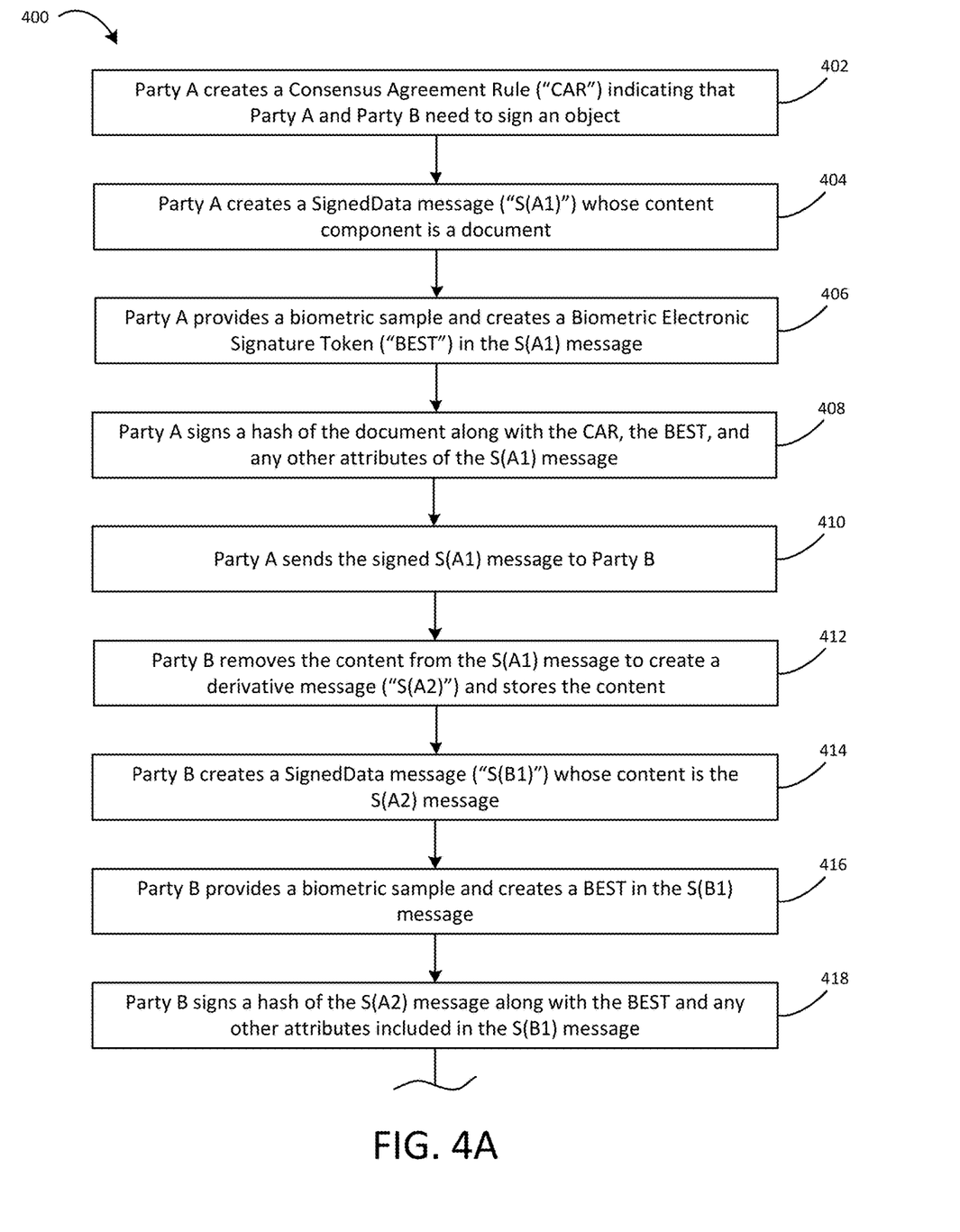
FIGS. 4A and 4B are a flow diagram showing a process of creating a privacy preserving consensus message and posting the message to a distributed ledger, according to another embodiment.
Figure 4B:
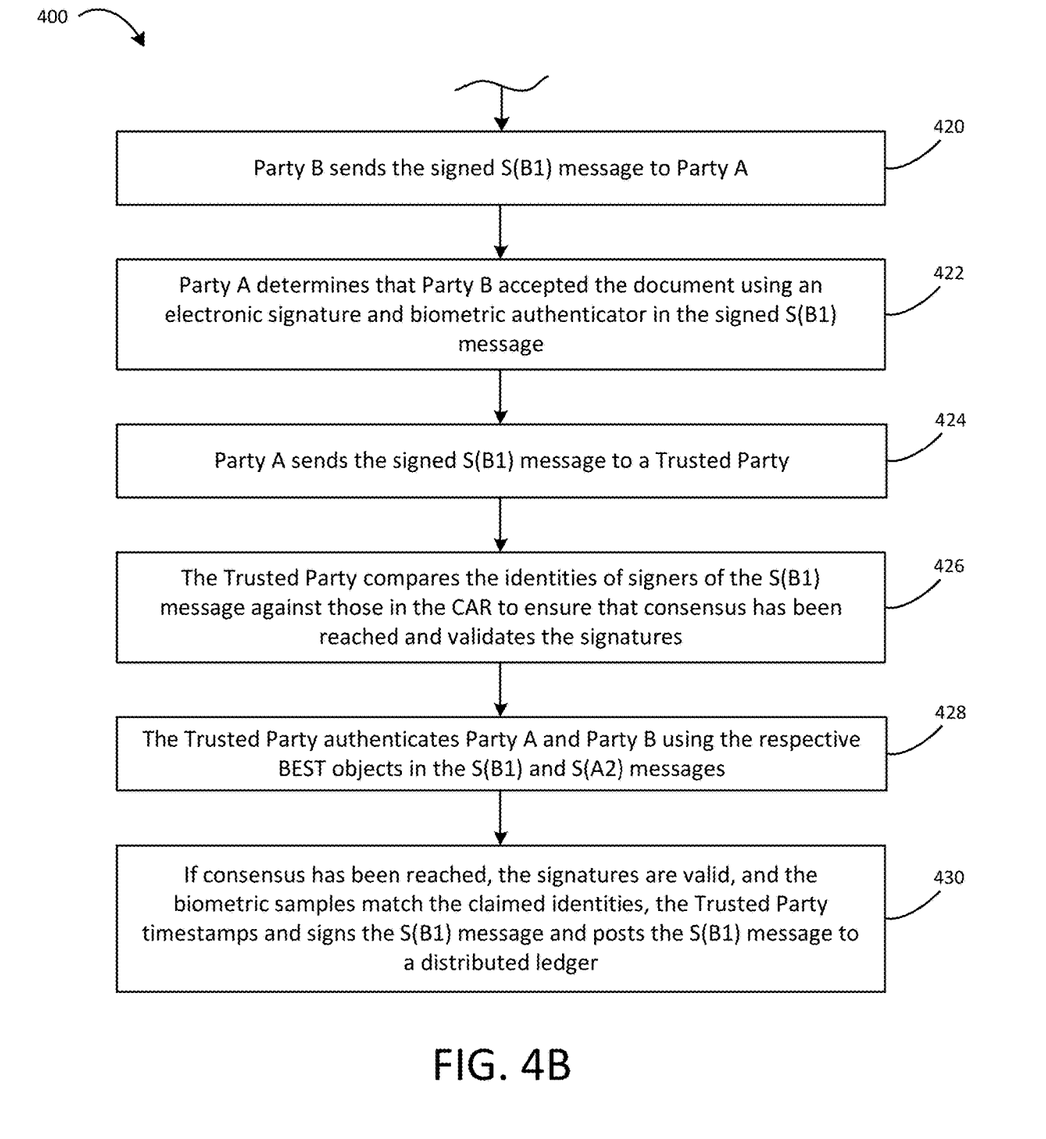

Referring now to FIGS. 4A and 4B, a flow diagram of a method 400 of creating a privacy preserving consensus message and posting the message to a distributed ledger is shown, according to an example embodiment. At step 402, Party A creates a CAR, for example, in a format supported by an online notary service and containing the information needed to later convince the notary that a consensus agreement has been reached between Party A and Party B. Similar to the CAR created in method 300, the CAR identifies Party A and Party B (e.g., using their digital public certificates) and may further indicate that Party A and Party B must sign an object (e.g., a form, a contract, a smart contract, a deed, a will, etc.) associated with the CAR to demonstrate that a consensus agreement has been reached. Additionally, in creating the CAR, Party A wants to ensure that strong, two-factor authentication bind the agreement between Party A and Party B. Accordingly, the CAR further indicates that Party A and Party B must biometrically authenticate to demonstrate that a consensus agreement has been reached. Party A and Party B must therefore sign the object using private keys of their public/private key pairs associated with their identified public key certificates, as well as provide a tokenized biometric sample in the form of a Biometric Electronic Signature Token ("BEST") that can be matched against an enrolled biometric reference template (e.g., enrolled with the online notary). It should be understood, however, that in other arrangements, Party A and Party B may agree to multi-factor authentication and/or authentication based on different factors (e.g., a possession factor). Furthermore, in some arrangements, descriptive prose describing the contract may also be included, though this prose, unless it is canned text, may be ignored during the Trusted Party's verification process described below.

As an illustration, the CAR may be specified as follows:

<ConsensusAgreementRule>
  <version>1</version>
  <ruleIdentifier><ruleID>1.2.3.4.
    </ruleID><ruleIdentifier>
  <consensusAgreementParties>
    <SubjectKeyIdentifier>Party A </SubjectKeyIdentifier>
    <SubjectKeyIdentifier>Party B</SubjectKeyIdentifier>
  </consensusAgreementParties>
  <multifactorRequirements logicalOperator="AND">
    <biometric/><signature/>
  </multi factorRequirements>
  <bindingTerms>"Legal prose describing contract"
    </bindingTerms>
</ConsensusAgreementRule>

At step 404, Party A creates an S(A1) message whose content component is the object that Party A and Party B must sign. For example, the content component may be a document, such as the PartyAContract. The S(A1) message also contains the CAR as an attribute and any further attributes Party A chooses to include in the S(A1) message, such as the OFFER attribute and the INTENT attribute. Additionally, at step 406, Party A provides a biometric sample and creates a BEST attribute (termed here as "$BEST_a$") within the S(A1) message. If Party A has not done so already, Party A further enrolls a biometric reference template associated with the biometric sample in a database (e.g., a database accessible to the Trusted Party). At step 408, Party A uses the indirect signature method of SignedData to sign a hash of the document as a signed attribute of the S(A1) message and also signs the CAR attribute, $BEST_a$ attribute, and any other attributes included in the S(A1) message. The signed S(A1) message may be described as follows:

S(A1)=SignedData PartyAContract, Signed(Hash(PartyAContract), CAR, $BEST_a$, OFFER, INTENT)

At step 410, Party A sends the signed S(A1) message to Party B, for example, in a similar manner as in step 308 of method 300. At step 412, Party B removes the PartyAContract document content from the S(A1) message signed and sent by Party A to create the derivative message S(A2), which may be specified as follows:

S(A2)=SignedData {Signed(Hash(PartyAContract), CAR, $BEST_a$, OFFER, INTENT)}

As in method 300, with S(A2), Party B now has a version of the offer S(A1) message that protects the privacy of the PartyAContract details but preserves Party A's signature. Party B then stores a copy of the PartyAContract document.

At step 414, Party B creates an S(B1) message whose content component is the S(A2) message. In the embodiment of method 400 shown in FIGS. 4A and 4B, Party B agrees to the terms included in the PartyAContract document. Accordingly, Party B also includes any other desired attributes in the S(B1) message, such as an ACCEPT attribute and an INTENT attribute. Further, at step 416, Party B provides a biometric sample and creates a BEST attribute (termed here as "$BEST_b$") in the S(B1) message. If Party B has not done so already, Party B enrolls a biometric reference template associated with the biometric sample in a database (e.g., a database accessible to the Trusted Party). At step 418, Party B uses the indirect signature method of SignedData to sign a hash of the S(A2) message as a signed attribute of the S(B1) message and also signs the CAR attribute, $BEST_b$ attribute, and any other attributes included in the S(B1) message. As such, the signed S(B1) message may be described as follows:

S(B1)=SignedData S(A2), Signed(Hash(S(A2)), $BEST_b$, ACCEPT, INTENT)

At step 420, Party B sends the signed S(B1) message to Party A. At step 422, Party A determines that Party B accepted the terms of the PartyAContract document using an electronic signature and a biometric authenticator, as required by the CAR, in the S(B1) message. Party A may further verify the S(B1) message by, e.g., comparing like elements of S(A1) and S(A2), validating signatures, and performing other checks. Once satisfied, at step 424, Party A sends the S(B1) message to a Trusted Party, such as an online notary.

At step 426, the Trusted Party compares the identities of the signers against those in the CAR to ensure that consensus has been reached and validates the signatures of Party A and Party B in the S(A2) message and the S(B1) message. The Trusted Party may retrieve the CAR, e.g., from the S(A2) message by decrypting the digital signatures of the parties on the S(B1) message and the S(A2) message (e.g., with known public keys of the parties). Furthermore, at step 428, the Trusted Party authenticates Party A and Party B using their respective BEST objects in the S(B1) and S(A2) messages. For example, the Trusted Party compares the BEST objects to enrolled biometric templates for Party A and Party B. Alternatively, in some arrangements, the template and the biometric authentication are processed indirectly by a third party Biometric Service Provider ("BSP"). At step 430, if consensus has been reached, the signatures are valid, and the biometric samples match the claimed identities, the Trusted Party timestamps and signs the S(B1) message and posts the S(B1) message to a distributed ledger. Alternatively, just prior to submitting the S(B1) message for timestamping and posting, the Trusted Party may compute a hash of the final S(B1) message and confirm with a log of hashes from other consensus agreements that the S(B1) message has not already been posted to the distributed ledger, as discussed above with reference to step 324 of method 300.

As discussed above with reference to method 300, at a subsequent time, either Party A or Party B may provide the original PartyAContract document to a third party, who can determine whether the contract is valid using the S(B1) message or the information posted by the Trusted Party. Additionally, the BEST biometric samples may be used to further provide evidence that Party A and Party B agreed to be bound to the terms of the PartyAContract document.

In each of method 300 and method 400, Party B accepts the terms of PartyAContract sent by Party A. However, a similar process could also be used to indicate that Party B rejects the terms of PartyAContract. For example, if Party B disagrees with the terms, Party B could create a SignedData message similar to S(B1), but rather than including an ACCEPT attribute in the SignedData message, Party B could include an attribute indicating that Party B rejects PartyAContract (termed here as "REJECT"). Party B could also include counteroffer terms (termed here as "PartyB-Contract") as content of this SignedData message. After receiving the counteroffer SignedData message, Party A could choose to accept the counteroffer terms by, for example, creating a derivative message of the counteroffer SignedData message that Party A indirectly signs in an acceptance SignedData message similar to the process described above with reference to method 300 or method 400. Alternatively, Party A could create its own counteroffer SignedData message and send that message to Party B. As such, Party A and Party B could continue to exchange messages until the parties agree on the terms of the agreement, in which case the parties create a consensus agreement message as described above with reference to method 300 or method 400, or until the parties determine that they are unable to agree on the terms of the agreement. In this latter situation, in some arrangements, the parties may create a SignedData message to confirm that the parties are unable to agree (e.g., similar to S(B1), except indicating that both parties reject the terms, such as using REJECT attributes), which the parties send to the Trusted Party and which the Trusted Party verifies and posts to the distributed ledger.

Additionally, in either method 300 or method 400, the Trusted Party (e.g., a Notary Service Provider ("NSP")) is able to send a receipt of successful processing, or a notice that the submission was rejected, to the submitting party (e.g., Party A in method 300 and method 400) as the NSP would have the submitting party's email. However, in some arrangements, the NSP may allow the parties to register with the NSP's service and then to create their own profile preferences. The profile allows them, for example, to provide their digital certificates as well as data protection preferences, notification preferences, and email addresses and other contact information. This enables the NSP, for example, to send an email receipt to each of the registered ConsensusAgreementParties in the CAR based on the preferences of the parties (e.g., none, per contract, daily, weekly, etc.). The email preference of a given party may also be plain, html., or signed and encrypted. The latter option would provide additional privacy to the party receiving the message. This registration capability would also enable other service messages. For example, if a required party signature were missing or if a party's biometric match failed, some other action could be taken according to the party's stored preferences.

Furthermore, because the SignedData message syntax supports multiple signers, per-signer authenticated attributes, unsigned attributes, and countersignatures, more elaborate scenarios than the above examples of method 300 and method 400 may be supported. Additionally, as an alternative to the above scenarios, it is possible for the parties to send SignedData messages to each other that contain the content of interest but to remove the content before posting the message(s) on a ledger to preserve the confidentiality of the content. If so, transaction details described in the content could be placed on, for example, a public journal with loss of confidentiality limited to the transacting parties. It is also possible to use distinct SignedData messages to conduct the example flows above, instead of the nested messages described. If these messages included a transaction set indicator, then a set of such messages posted to a blockchain could be collected for audit and other purposes. If each message was a distinct block on the ledger, then a program for identifying messages posted to a distributed ledger could be used to collect this information.

It should further be understood that method 300 and method 400 are intended to be exemplary and that other embodiments of processes for demonstrating consensus agreement using cryptographic containers may be used. For example, in both method 300 and method 400, the CAR is included in the signed attributes of the S(A1) and S(A2) messages. However, in alternate embodiments, the S(A1) and S(A2) messages may instead include an identifier of the applicable CAR for the parties and the PartyAContract. For example, the identifier is the rule identifier stored in the ruleIdentifier component of the CAR. The CAR may be stored (e.g., by Party A) in a database accessible to the Trusted Party, and the Trusted Party retrieves the CAR based on the identifier (e.g., by matching the identifier to the rule identifier in the CAR). As a second example, the terms of the agreement between Party A and Party B may be formatted as a smart contract whose execution may cause a transfer of value. Accordingly, after the Trusted Party posts the S(B1) message to the distributed ledger, Party A and Party B may initiate the smart contract such that the terms of the smart contract are self-executing and, for example, automatically cause a transfer of value in response to the occurrence of an event or the fulfillment of a condition. As a third example, the CAR for method 300 or method 400 may include an identification of the parties required for the agreement (e.g., in a requiredParties component of the CAR). As such, step 322 of method 300 or step 426 of method 400 may further include comparing the parties with digital signatures in the S(B1) message to the parties identified as required for the agreement to ensure that all required parties have reached consensus by digitally signing the S(B1) message.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include machine or non-transitory computer-readable media that are executable by one or more processors (e.g., multiple remote processors connected to each other through any type of network). The non-transitory machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits ("IC"), discrete circuits, system on a chip ("SOC") circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit ("ASIC"), one or more field programmable gate arrays ("FPGA"s), a digital signal processor ("DSP"), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 110). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 110. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method of demonstrating consensus agreement, comprising:
    receiving, by a second party from a first party, a consensus agreement rule ("CAR") comprising at least identities of the first party and the second party;
    receiving, by the second party from the first party, a first SignedData message comprising at least first content and a first digital signature of the first party on at least a hash of the first content and an offer indication, wherein the first content comprises terms of an agreement between the first party and the second party;
    creating, by the second party, a second SignedData message comprising at least a second digital signature of the second party on at least a hash of the second content and an acceptance indication;
    verifying, based on the acceptance indication and based on the identities on the CAR matching the identities on the first and second digital signatures, that the second party accepted the terms of the agreement; and
    in response to the verification, transmitting the second SignedData message to a trusted party for posting to a distributed ledger;
    wherein the terms of the agreement are kept private to the first and second parties while the second SignedData message is posted to the distributed ledger, and wherein the terms of the agreement are formatted as a smart contract whose execution causes a transfer of value in response to at least one of an occurrence of an event or a fulfillment of a condition.

2. The method of claim 1, wherein the CAR is included in a signed attribute of the first SignedData message.

3. The method of claim 1, wherein the second digital signature is further on an identifier of the CAR; and
    wherein the method further comprises storing the CAR in a database accessible to the trusted party.

4. The method of claim 1, wherein the method further comprises enrolling a biometric reference template for the second party; and
    wherein creating the second SignedData message further comprises:
        providing a biometric sample of the second party; and
        creating a second biometric electronic signature token ("BEST") comprising the biometric sample of the second party;
        wherein the second digital signature is further on the second BEST.

5. The method of claim 4, wherein the first digital signature is further on a first BEST, the first BEST comprising a biometric sample of the first party.

6. The method of claim 1, further comprising:
    registering one or more notification preferences with the trusted party; and
    after the second SignedData message is posted to the distributed ledger, receiving a receipt from the trusted party based on the registered notification preferences.

7. The method of claim 1, wherein the second SignedData message comprises a rejection indication, the method further comprising:

transmitting, by the second party to the first party, a counteroffer SignedData message comprising the second SignedData message.

8. A system of demonstrating consensus agreement, the system associated with a second party to an agreement, comprising:
a processor; and
a non-transitory machine readable medium with instructions stored thereon that, when executed by the processor, cause the system to:
receive, from a first party, a consensus agreement rule ("CAR") comprising at least identities of the first party and the second party;
receive, from the first party, a first SignedData message comprising at least first content and a first digital signature of the first party on at least a hash of the first content and an offer indication, wherein the first content comprises terms of the agreement between the first party and the second party;
create a second SignedData message comprising at least a second digital signature of the second party on at least a hash of the second content and an acceptance indication;
verify, based on the acceptance indication and based on the identities on the CAR matching the identities on the first and second digital signatures, that the second party accepted the terms of the agreement; and
in response to the verification, transmit the second SignedData message to a trusted party for posting to a distributed ledger;
wherein the terms of the agreement are kept private to the first and second parties while the second SignedData message is posted to the distributed ledger, and wherein the terms of the agreement are formatted as a smart contract whose execution causes a transfer of value in response to at least one of an occurrence of an event or a fulfillment of a condition.

9. The system of claim 8, wherein the CAR is included in a signed attribute of the first SignedData message.

10. The system of claim 8, wherein the second digital signature is further on an identifier of the CAR; and
wherein the instructions further cause the system to store the CAR in a database accessible to the trusted party.

11. The system of claim 8, wherein the instructions further cause the system to enroll a biometric reference template for the second party; and
wherein creating the second SignedData message further comprises:
providing a biometric sample of the second party; and
creating a second biometric electronic signature token ("BEST") comprising the biometric sample of the second party;
wherein the second digital signature is further on the second BEST.

12. The system of claim 11, wherein the first digital signature is further on a first BEST, the first BEST comprising a biometric sample of the first party.

13. The system of claim 8, wherein the instructions further cause the system to:
register one or more notification preferences with the trusted party; and
after the second SignedData message is posted to the distributed ledger, receive a receipt from the trusted party based on the registered notification preferences.

14. The system of claim 8, wherein the second SignedData message comprises a rejection indication, and wherein the instructions further cause the system to:
transmit, to the first party, a counteroffer SignedData message comprising the second SignedData message.

15. A non-transitory computer readable media having computer-executable instructions embodied therein that, when executed by a computing system associated with a second party to an agreement causes the second party computing system to perform operations for demonstrating consensus agreement, the operations comprising:
receiving, from a computing system associated with a first party, a consensus agreement rule ("CAR") comprising at least identities of the first party and the second party;
receiving, from the first party computing system, a first SignedData message comprising at least first content and a first digital signature of the first party on at least a hash of the first content and an offer indication, wherein the first content comprises terms of the agreement between the first party and the second party;
creating a second SignedData message comprising at least a second digital signature of the second party on at least a hash of the second content and an acceptance indication;
verifying, based on the acceptance indication and based on the identities on the CAR matching the identities on the first and second digital signatures, that the second party accepted the terms of the agreement; and
in response to the verification, transmitting the second SignedData message to a trusted party for posting to a distributed ledger;
wherein the terms of the agreement are kept private to the first and second parties while the second SignedData message is posted to the distributed ledger, and wherein the terms of the agreement are formatted as a smart contract whose execution causes a transfer of value in response to at least one of an occurrence of an event or a fulfillment of a condition.

16. The computer readable media of claim 15, wherein the CAR is included in a signed attribute of the first SignedData message.

17. The computer readable media of claim 15, wherein the operations further comprise enrolling a biometric reference template for the second party; and
wherein creating the second SignedData message further comprises:
providing a biometric sample of the second party; and
creating a second biometric electronic signature token ("BEST") comprising the biometric sample of the second party;
wherein the second digital signature is further on the second BEST.

18. The computer readable media of claim 17, wherein the first digital signature is further on a first BEST, the first BEST comprising a biometric sample of the first party.

19. The computer readable media of claim 15, the operations further comprising:
registering one or more notification preferences with the trusted party; and
after the second SignedData message is posted to the distributed ledger, receiving a receipt from the trusted party based on the registered notification preferences.

20. The computer readable media of claim 15, wherein the second SignedData message comprises a rejection indication, the operations further comprising:
transmitting, to the first party computing system, a counteroffer SignedData message comprising the second SignedData message.

* * * * *